Sept. 29, 1931.    I. THOMAS    1,825,026
CASING SPEAR
Filed July 7, 1930
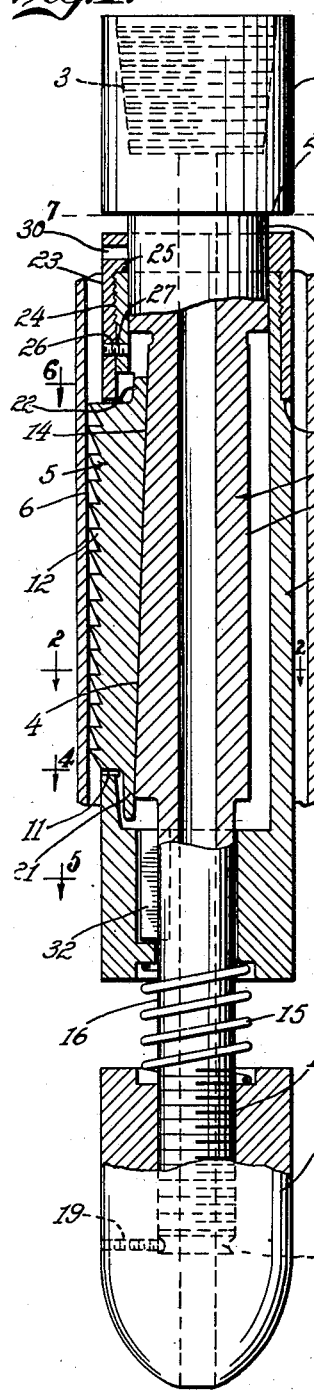
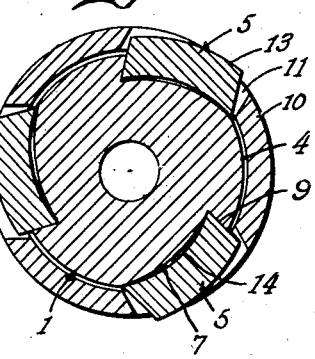
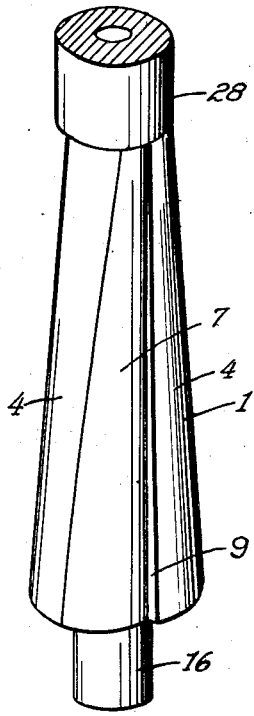
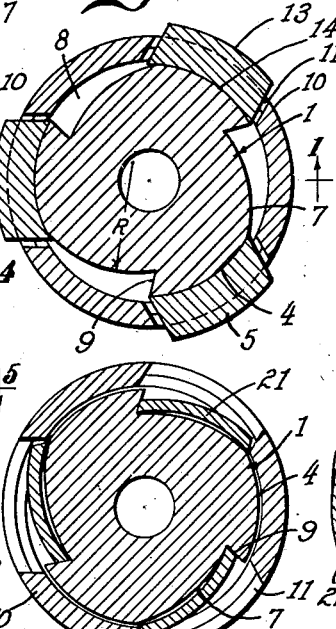
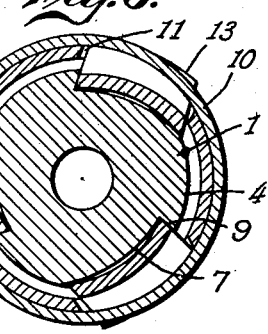
Inventor
Idris Thomas;
By Lyon & Lyon
Attorneys Patented Sept. 29, 1931

1,825,026

UNITED STATES PATENT OFFICE

IDRIS THOMAS, OF WHITTIER, CALIFORNIA

CASING SPEAR

Application filed July 7, 1930. Serial No. 465,995.

This invention relates to casing spears of the type which embodies in its construction a plurality of slips that are mounted on a mandrel and operating to expand when relative upward shifting movement, or a relative rotation of the mandrel occurs, with respect to the slips, thereby causing the slips to grip the wall of the casing. Spears of this type operate so that by rotation of the mandrel, the "set" slips will be released from the casing. The general object of this invention is to provide a casing spear of this type, with an improved construction to facilitate the detachment and replacement of the slips when desired; also to provide a casing spear of this type of few parts and operating to maintain the slips normally in an elevated position so that the spear will be maintained in a collapsed condition while it is being lowered down the casing.

A further object of the invention is to provide a construction in which slips can be employed which are of uniform thickness circumferentially.

Further objects of the invention will appear hereinafter.

The invention consists in the novel parts and combinations of parts to be described hereinafter, all of which contribute to produce an efficient casing spear.

A preferred embodiment of the invention is described in the following specification, while the broad scope of the invention is pointed out in the appended claims.

In the drawings:

Figure 1 is a view showing portions of the spear in vertical section with certain parts broken away and shown in elevation. This view shows a short portion of the wall of the casing, and illustrates the spear in its "set," or gripping, position.

Figure 2 is a horizontal section taken on the line 2—2 of Figure 1 but omitting the casing.

Figure 3 is a section similar to Figure 2, showing the slips in their collapsed position.

Figure 4 is a horizontal cross-section on the line 4—4 of Figure 1 passing through the lower tangs of the slips and particularly illustrating the way in which they are retained by the lower end of the slip carrier.

Figure 5 is a cross-section on the line 5—5 of Figure 1 and particularly illustrating the means for limiting the relative rotary movement of the slip carrier and the mandrel.

Figure 6 is a cross-section taken on the line 6—6 of Figure 1 and further illustrating details of the construction at the upper tangs of the slips.

Figure 7 is a perspective of the mandrel with the slips and slip-carrier removed from the same, and showing the upper portion of the mandrel as though cut off at the line 7—7 of Figure 1.

Referring more particularly to the parts, 1 represents the mandrel which is provided at its upper end with a head 2 carrying a threaded box 3 to enable it to be attached to the lower end of a tool string. The body of the mandrel is tapered longitudinally so that it presents a plurality of substantially conical faces 4, the enlarged end of the tapered portion being disposed downwardly. In the present instance there are three of these conical faces. They operate as thrust faces to cooperate with the slips 5 to expand the spear and force the slips outwardly against the wall of a casing 6. In the present instance there are three of these conical faces 4 but there may be more or less of them, as may be desired.

Between the thrust faces 4 circumferentially the body of the spear is provided with relieving faces 7, at which points the mandrel is untapered. These faces 7 are preferably cylindrical faces struck with a radius such as indicated at R in Figure 2. In this way, at the relieving faces 7 recesses 8 are formed in the face of the mandrel which are occupied by the slips when the spear is in its unexpanded or collapsed condition. At such a time the edges of the slips come up against substantially radial shoulders 9 that extend longitudinally with the mandrel.

In order to hold the slips 6 so that they always extend longitudinally with the mandrel and to provide for their removal when desired, I provide a slip carrier or cage 10 which is of substantially tubular form and provided with openings 11 through which the toothed portion 12 of the slips projects (see Figure 1).

The outer faces or peripheries 13 of the teeth of the slips are struck on a radius from the axis of the mandrel that is substantially the same as the inner diameter of the casing with which the spear is to co-operate. The inner faces 14 of the slips are of conical form so as to fit neatly on the conical faces 4 when the spear is in its expanded condition.

I provide means for normally holding the slips in their elevated position on the mandrel and this means preferably accomplishes its function by holding the slip carrier or cage 10 in its elevated position. For this purpose I prefer to provide a coil spring 15 that is received over a reduced neck 16 that forms the lower end of the mandrel. The lower end of this spring thrusts against the upper end of a bowl 17 that is connected by a screw thread 18 onto the lower end of the neck and locked in place by means of a small threaded locking pin 19 the end of which is received in a circumferential groove 20 formed in the lower end of the neck 16.

The lower end of each slip is formed with a tang 21 that extends downwardly past the lower edge of its corresponding opening 11 in the cage or slip carrier 10. The upper end of each slip is provided with a similar tang 22.

I provide special means for retaining the slips at their upper ends. For this purpose I provide a retaining member preferably in the form of a collar 23 that fits over the upper end of the cage and is preferably connected to it by screw threads 24. The upper end of the collar may be provided with a shoulder 25 that seats on the uper end of the cage. In order to prevent the collar from working loose, I prefer to secure it in place by means of a small threaded locking pin 26 that is received in a threaded opening 27 in the cage (see Figure 1). The lower edge of the collar extends down below the upper edge of the openings 11 and projects in front of the tangs 22 so as to retain the slips.

At the upper end of the cage and opposite the collar 23 the mandrel is provided with a guide neck 28 of cylindrical form. In the collapsed condition of the spear the spring 15 holds the upper end of the collar 23 against a shoulder 29 formed at the lower end of the head 2.

In using the spear the slips 5 can be set against the casing wall either by a relative upward shifting of the mandrel if the slips are on the thrust faces 4, or by a rotation of the mandrel in the cage in the proper direction. In the latter case the relieving faces 7 operate as cams to force the slips outwardly until they ride on the thrust faces 4.

In order to enable the collar 23 to be rotated, it is preferably provided with one or more radial openings 30 to receive a pin or a spanner wrench. When it is desired to remove the slips this can be accomplished by removing the pin 26 and then rotating the collar 23 while it is in contact with the shoulder 29. This will cause the cage 10 to back off from the collar and this backing off movement will be continued until the upper edges of the openings 11 substantially align with the lower edge 31 of the collar, at which time the tangs 22 can be swung out through the upper ends of the openings 11.

In order to limit the relative rotary movement of the mandrel in one direction, for example, in an anti-clockwise direction in the present instance, within the cage I provide suitable means for this purpose. In the present instance I employ a key 32 (see Figure 5) that projects outwardly from the neck 16 of the mandrel and the outer portion of this key is received in a circumferential slot 33 formed in the adjacent face of the cage.

In using the tool when constructed as described above, it will be evident that by clockwise rotation of the mandrel in the cage 10 the relieving faces 7 will operate to effect the releasing of the slips, enabling them to come into the position in which they are indicated in Figure 2.

It should be understood that this tool can be constructed so that the slips will move outwardly by relative right-hand rotation of the mandrel instead of by left-hand rotation as described herein.

It should be also understood that as regards the construction of the tool at the collar 23 I do not limit myself to the use of this collar only with tools of this class. This back-off collar 23 co-operating with an upwardly pressed cage carrying detachable tools, could be used for other specific purposes.

It is understood that the embodiment of the invention described herein is only one of the many embodiments this invention may take, and I do not wish to be limited in the practice of the invention, nor in the claims, to the particular embodiment set forth.

What I claim is:

1. In a casing spear, the combination of a mandrel with a tapered portion having thrust faces, and with its enlarged end disposed downward, slips received on said thrust faces and co-operating with the mandrel when it is pulled upwardly, to expand and engage the wall of the casing, a slip-carrier for holding the slips so that they extend longitudinally with the mandrel, said mandrel being capable of rotation relative to the slip carrier and having untapered portions located circumferentially between said thrust faces forming recesses to receive the slips when a relative rotation of the mandrel takes place, thereby releasing the spear, and means for yieldingly holding the slips in an elevated position on the mandrel.

2. In a casing spear, the combination of a mandrel with a tapered portion having thrust faces, and with its enlarged end disposed downward, slips received on said thrust faces and co-operating with the mandrel when it is pulled upwardly, to expand and engage the wall of the casing, to a slip-carrier mounted for relative rotation with respect to the mandrel, for holding the slips so that they extend longitudinally with the mandrel, said mandrel having untapered portions located circumferentially between said thrust faces forming recesses to receive the slips when a relative rotation of the mandrel takes place, thereby releasing the spear, means for yieldingly holding the slip-carrier in an elevated position on the mandrel, and means for limiting the relative rotary movement of the mandrel and the slip-carrier.

3. In a casing spear, the combination of a mandrel with a tapered portion having thrust faces and with its enlarged end disposed downward, slips received on said thrust faces and co-operating with the mandrel when shifted downwardly on the mandrel to expand and engage the wall of the casing, a slip-carrier mounted for relative rotation on the mandrel and having the form of a tubular cage with openings for holding the slips so that they extend longitudinally with the mandrel, said mandrel having untapered portions located circumferentially between said thrust faces forming recesses to receive the slips when a relative rotation of the mandrel takes place, thereby releasing the spear, said mandrel having a shoulder at its upper end, a collar mounted on the upper end of the cage for retaining the slips at their upper ends, and means for yieldingly holding the cage in an elevated position with said collar thrusting against the shoulder.

4. In a casing spear, the combination of a mandrel having a tapered portion with its enlarged end disposed downward and having thrust faces, slips received on said thrust faces and co-operating with the mandrel to expand and engage the wall of the casing, a slip-carrier for holding the slips so that they extend longitudinally with the axis of the mandrel, said slips having tangs at their lower ends retained by said carrier and also having tangs at their upper ends projecting upwardly, a collar mounted on the upper end of the mandrel for engaging the upper tangs to retain the slips at their upper ends, and means for yieldingly pressing the carrier upwardly.

5. In a casing spear, the combination of a mandrel having a tapered portion with its enlarged end disposed downward and having conical thrust faces, slips received on said thrust faces and co-operating with the mandrel to expand and engage the wall of the casing, a slip-carrier for holding the slips so that they extend longitudinally with the axis of the mandrel, said slips having tangs at their lower ends retained by said carrier and also having tangs at their upper ends projecting upwardly, a collar mounted on the upper end of the mandrel seating on the upper end of the slip-carrier for engaging the upper tangs to retain the slips at their upper ends, and means for yieldingly pressing the carrier upwardly.

6. In a casing spear, the combination of a mandrel having a tapered portion with its enlarged end disposed downward and having thrust faces, slips received on said thrust faces and co-operating with the mandrel to expand and engage the wall of the casing, a slip-carrier for holding the slips so that they extend longitudinally with the axis of the mandrel, said slips having tangs at their lower ends retained by said carrier and also having tangs at their upper ends projecting upwardly, a collar mounted on the upper end of the mandrel for engaging the upper tangs to retain the slips at their upper ends, said mandrel having a shoulder at its upper end, and a spring at the lower end of the mandrel for yieldingly pressing the carrier upwardly toward the shoulder.

7. In a casing spear, the combination of a mandrel having a tapered portion with its enlarged end disposed downward and having thrust faces, slips received on said thrust faces and co-operating with the mandrel to expand and engage the wall of the casing, a slip-carrier in the form of a cage mounted for relative rotation on the mandrel, for holding the slips so that they extend longitudinally with the axis of the mandrel, said slips having tangs at their lower ends retained by said carrier and also having tangs at their upper ends projecting upwardly, a collar mounted on the upper end of the mandrel for engaging the upper tangs to retain the slips at their upper ends, and having a thread connection with the upper end of the slip-carrier and projecting down over the upper tangs to retain the slips at their upper ends, said mandrel having a shoulder above the said slip-carrier, and a spring at the lower end of the mandrel for pressing the slip-carrier upwardly to maintain the collar against said shoulder.

8. In a casing spear, the combination of a mandrel having a tapered portion with its enlarged end disposed downward and having thrust faces, slips received on said thrust faces and co-operating with the mandrel to expand and engage the wall of the casing, a slip-carrier consisting of a cage mounted for relative rotation on the mandrel, for holding the slips so that they extend longitudinally with the axis of the mandrel, said slips having tangs at their lower ends retained by said carrier and also having tangs at their upper ends projecting upwardly, a collar mounted on the upper end of the mandrel for engaging the upper tangs to retain the slips at their upper ends, and means for yieldingly pressing the carrier upwardly, said mandrel having relieving faces adjacent said thrust faces permitting the slips to move inwardly by relative rotation of the mandrel within the cage, to release the slips from engagement with the wall of the casing.

9. In a casing spear, the combination of a mandrel having a tapered portion with its enlarged end disposed downward and having thrust faces, slips received on said thrust faces and co-operating with the mandrel to expand and engage the wall of the casing, a slip-carrier mounted for relative rotation on the mandrel, for holding the slips so that they extend longitudinally with the axis of the mandrel, said slips having tangs at their lower ends retained by said carrier and also having tangs at their upper ends projecting upwardly, a collar mounted on the upper end of the mandrel for engaging the upper tangs to retain the slips at their upper ends, and means for yieldingly pressing the carrier upwardly, said mandrel having relieving faces adjacent the said thrust faces forming recesses in the side of the mandrel to receive the slips when the spear is collapsed, said parts co-operating by relative rotation of the mandrel to bring the thrust faces into engagement with the slips and set the slips in engagement with the casing.

10. In a casing spear, the combination of a mandrel having a tapered portion with its enlarged end disposed downward and having thrust faces, slips received on said thrust faces and co-operating with the mandrel to expand and engage the wall of the casing, a slip-carrier mounted for relative rotation on the mandrel, for holding the slips so that they extend longitudinally with the axis of the mandrel, said slips having tangs at their lower ends retained by said carrier and also having tangs at their upper ends projecting upwardly, a collar mounted on the upper end of the mandrel for engaging the upper tangs to retain the slips at their upper ends, and means for yieldingly pressing the carrier upwardly, said mandrel having relieving faces adjacent the said thrust faces forming recesses in the side of the mandrel to receive the slips when the spear is collapsed, said parts co-operating by relative rotation of the mandrel to bring the thrust faces into engagement with the slips and set the slips in engagement with the casing, said mandrel having longitudinally extending shoulders corresponding to the relieved faces against which the side edges of the slips may rest when the spear is in its collapsed condition.

11. In a casing spear, the combination of a mandrel having a tapered portion with its enlarged end disposed downward and having conical trust faces, slips received on said thrust faces and co-operating with the mandrel to expand and engage the wall of the casing, a slip-carrier mounted for relative rotation on the mandrel, for holding the slips so that they extend longitudinally with the axis of the mandrel, said slips having tangs at their lower ends retained by said carrier and also having tangs at their upper ends projecting upwardly, a collar mounted on the upper end of he mandrel seating on the upper end of the slip-carrier for engaging the upper tangs to retain the slips at their upper ends, and means for yieldingly pressing the carrier upwardly, said mandrel having relieving faces adjacent the conical thrust faces forming recesses for receiving the slips when the spear is in its collapsed condition, said parts co-operating to enable the spear when set in the casing to be released by a relative rotation of the mandrel within the slip-carrier.

12. In a casing spear, the combination of a mandrel having a tapered portion with its enlarged end disposed downward and having conical thrust faces, slips received on said thrust faces and co-operating with the mandrel to expand and engage the wall of the casing, a slip-carrier mounted for relative rotation on the mandrel, for holding the slips so that they extend longitudinally with the axis of the mandrel, said slips having tangs at their lower ends detained by said carrier and also having tangs at their upper ends projecting upwardly, a coller mounted on the upper end of the mandrel seating on the upper end of the slip-carrier for engaging the upper tangs to retain the slips at their upper ends, and means for yieldingly pressing the carrier upwardly, said mandrel having relieving faces adjacent the conical thrust faces forming recesses for receiving the slips when the spear is in its collapsed condition, said parts co-operating to enable the spear when set in the casing to be released by a relative rotation of the mandrel within the slip-carrier, said mandrel being untapered at said relieving faces, whereby a downward movement of the slip-carrier and slips while the slips are in said recesses will maintain the spear in a collapsed condition.

13. In a device of the kind described, the combination of a mandrel having a shoulder, members mounted on the mandrel, a carrier carrying the said members, a retaining collar having a thread connection with said carrier, operating to retain the members in the carrier, and a spring for yieldingly pressing the collar against the said shoulder and co-operating with the collar to permit the rotation of the collar against the shoulder to back the carrier away from the shoulder to permit the detachment of the said members from the mandrel.

14. In a device of the kind described, the combination of a mandrel having a shoulder, a plurality of members carried on the mandrel, a carrier for said members, and a collar having a threaded connection with the upper end of the carrier to thrust against said shoulder and operating to retain the members in the carrier.

Signed at Los Angeles, Cal., this 26th day of June, 1930.

IDRIS THOMAS.